(12) United States Patent
Emilio Santini

(10) Patent No.: US 6,757,134 B2
(45) Date of Patent: Jun. 29, 2004

(54) HIGH DENSITY THIN FILM INDUCTIVE HEAD STRUCTURE HAVING A PLANARIZED COIL INSULATION STRUCTURE INCLUDING HARD BAKED PHOTORESIST AND A FILLER MATERIAL

(75) Inventor: Hugo Alberto Emilio Santini, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 73 days.

(21) Appl. No.: 10/095,882

(22) Filed: Mar. 11, 2002

(65) Prior Publication Data

US 2003/0169534 A1 Sep. 11, 2003

(51) Int. Cl.$^7$ ............................. G11B 5/147; G11B 5/17
(52) U.S. Cl. ........................ 360/126; 360/123
(58) Field of Search ................... 360/317, 123, 360/126

(56) References Cited

U.S. PATENT DOCUMENTS

| | | | | |
|---|---|---|---|---|
| 5,729,887 A | * | 3/1998 | Irie | ............... 29/602.1 |
| 6,446,401 B1 | * | 9/2002 | Krupp | ............... 52/127.5 |
| 6,456,459 B1 | * | 9/2002 | Sasaki | ............... 360/126 |
| 2002/0024766 A1 | * | 2/2002 | Sasaki et al. | ............... 360/126 |
| 2002/0057526 A1 | * | 5/2002 | Sasaki | ............... 360/126 |
| 2002/0191350 A1 | * | 12/2002 | Emilio Santini | ............... 360/317 |
| 2003/0136757 A1 | * | 7/2003 | Hasegawa et al. | ............... 216/22 |

* cited by examiner

*Primary Examiner*—Jefferson Evans
(74) *Attorney, Agent, or Firm*—Esther E. Klein; Ron Feece (57) ABSTRACT

An improved design for a high density thin film inductive write head assembly is provided. A pedestal and back flux closure of ferromagnetic material are formed on opposite ends of a planarized first pole piece. A plurality of coils of conductive material are deposited on top of the first pole piece between the pedestal and back flux closure. The coils comprise a plurality of loops or turns having voids between the coil loops. A photo resist material is deposited in the voids between the coils and the back flux closure, which is hard baked. A layer of alumina is deposited over the coils and hard baked photo resist material. The pedestal, back gap, coils, photo resist, and alumina are planarized by using a chemical mechanical polishing process. The thickness of the photo resist material relative to the coils is reduced using an $O_2$ reactive ion etching process. A hard carbon or alumina filler is applied to fill the gaps between the coils and the photo resist. A CMP process is performed to planarize the carbon filler, coils, back flux closure and the pedestal.

23 Claims, 11 Drawing Sheets

Fabricate Cu Coils

FIG. 3a

Insulate Cu Coils + Etch Alumna

FIG. 3b

Fabricate Pedestal and Back Gap + Deposit more Hard Baked Resist

Plate and remove Seed Layer

FIG. 6d

Insulate with Hard Baked Resist and CMP Flat

FIG. 6e

O2 RIE Resist Tops

FIG. 6i

HIGH DENSITY THIN FILM INDUCTIVE HEAD STRUCTURE HAVING A PLANARIZED COIL INSULATION STRUCTURE INCLUDING HARD BAKED PHOTORESIST AND A FILLER MATERIAL

FIELD OF THE INVENTION

This invention relates to magnetic head assemblies applicable to magnetic disk drive systems. More particularly this invention relates to high data rate, high efficiency, inductive, thin film heads.

BACKGROUND OF THE INVENTION

Figure 1:
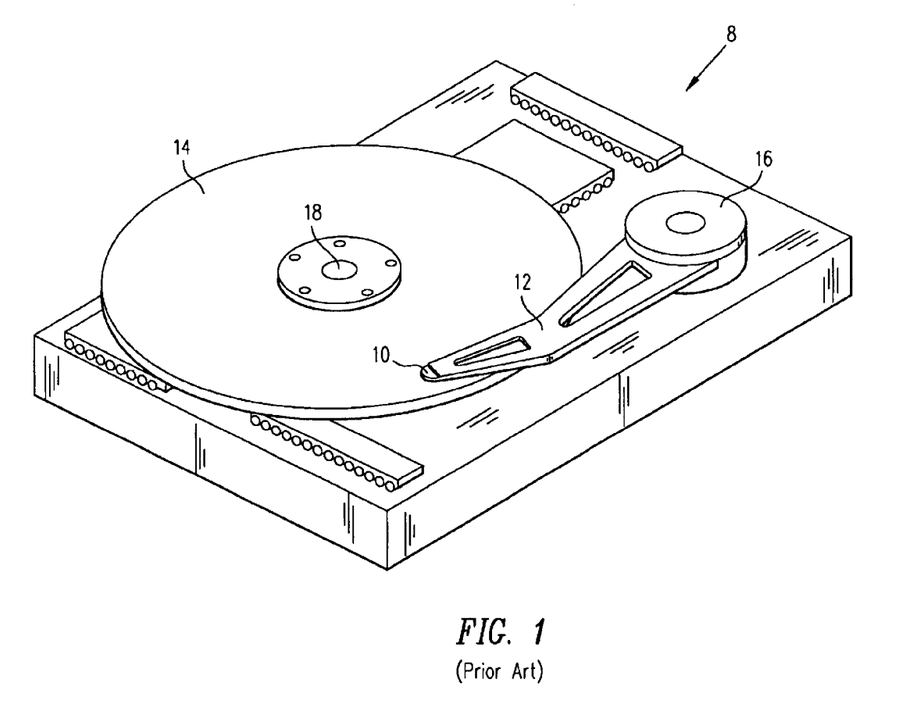
FIG. 1 is an illustration of a disk drive system in which the head of the invention can be embodied.

Magnetic transducers (read-write heads) are used for reading and writing magnetically coded data stored on a magnetic storage medium such as a magnetic tape or magnetic disk. In a disk drive system 8, as seen in FIG. 1, a magnetic read-write head 10 is attached to an actuator 12 that flies above a rotating magnetic disk 14. A voice coil motor (VCM) 16 pivots the actuator to position the head 10 over selected circular tracks on the disk 14. The actuator rides on an air-bearing surface over the rotating disk. The disk 14 is attached to a spindle 18 that is rotated by a spindle motor. The disk 14 comprises a substrate having a plurality of thin films deposited thereon. The thin films include ferromagnetic material that is used to record the magnetic transitions, written by the magnetic transducer 10, in which information is encoded. A tape based storage system uses a magnetic transducer in essentially the same way as a disk drive with the moving tape being used in place of a rotating disk.

The magnetic transducer is composed of elements that perform the tasks of writing magnetic transitions and reading the magnetic transitions. In that way, the magnetic transducer is composed of a write-head and a read-head. The electrical signals to and from the read and write heads travel along conductive paths, which are attached to or embedded in the actuator.

A thin film recording head (write head) includes first and second pole pieces that are magnetically coupled together at the "pole tip region" and the "back gap". In the pole tip region, the first and second pole pieces provide first and second pole tips. The pole pieces are typically fabricated using plating techniques. A thin insulative, nonmagnetic gap layer separates the pole tips. The pole tip region is defined by a head surface in what is referred to as the "zero throat height" between the air bearing surface (ABS) and the back gap. A yoke, or body portion of the head lies between zero throat height and the back gap. The term back gap is used in the art to mean the back of the yoke. Historically, there was a gap in the back of the yoke and the term back gap continues to be used even though the back of the yoke is now continuous. The back gap is also, more accurately, referred to as the "back flux closure." The body portion of the head contains one or more layers of pancake coils and plurality of insulation layers. The pancake coils couple flux into the pole pieces and/or receive flux there from. Each layer of the head is applied using photolithographic techniques such as photoresist exposure systems.

There is a continuing strong felt need to increase the data storage density in magnetic storage media. Most efforts to increase magnetic storage density involve techniques for increasing the aerial bit density of the magnetic medium.

In rotating magnetic disk drive systems, the aerial density is the product of the number of flux reversals per millimeter along a data track and the number of tracks available per millimeter of disk radius. Thus, a high aerial data storage density requires recording heads with high linear resolution and a narrow track well.

The thickness of the gap layer at the head's air-bearing surface determines the linear density of the head, namely how many bits per linear unit length along a data track of a magnetic medium the head can write. The width of the second pole tip determines head track width. The head track width establishes how many data tracks across the width of a magnetic medium per unit length the head can write. The product of these two factors is aerial density.

One way to increase the data rate of a head is to decrease the pitch of the coil layer. The pitch is the distance across one turn of the coil plus one space between the turn and the next turn. It would be desirable for the coil to have a pitch of 1 micrometer (um) or less. Unfortunately, when the data rate is increased with a low pitch coil, the head suffers from an increase in heat and an increase in eddy currents between the first and second pole pieces. Eddy currents reduce the write current, which in turn reduces the write signal across the write gap. One way to reduce eddy currents in the write head is to employ two coil layers which are stacked one above the other, which allows for a shorter write head. However, when designing a head with two layers of coils certain extra steps need to be taken in order to minimize increased sensitivities inherent in such a structure. For example, there is an increased need to planarize and protect the coil layers.

Inductive heads, especially the ones having very high recording densities, have to use full planarization techniques when manufacturing the thin film layers in order to obtain maximum efficiency from the imaging systems used to produce the heads. Independent of the photo-resist exposure system used in the fabrication of the critical photo-resist layers, each layer needs to have a reproducible photo-resist coating thickness as well as a very tight focal plane (which means a small total indicated run-out). Such basic requirements are in order to produce a tight control and resolution. Two of the most critical structures for effectiveness of the inductive head are the magnetic pole (which defines the track width available for the magnetic recording media) and the inductive coil system. While the poles control the aerial recording densities, the size and shape of the coils, together with the basic head design, control the efficiency and speed of the recording head.

There is a need for a head design and a method to produce such a head, which produces a high-density, high data rate head with high magnetic recording efficiency. Such a design can be used with heads designed having a pedestal to improve efficiency as disclosed in commonly owned U.S. Pat. No. 6,259,583, hereby incorporated by reference.

Inductive head designs need to use planarization techniques in order to produce high-resolution coils and poles. The pole fabrication process does not face planarization issues since the pole piece is an isolated structure. However, there are basic problems that arise in planarizing the coils since the coils comprise a plurality of metalized lines.

Figure 2A:
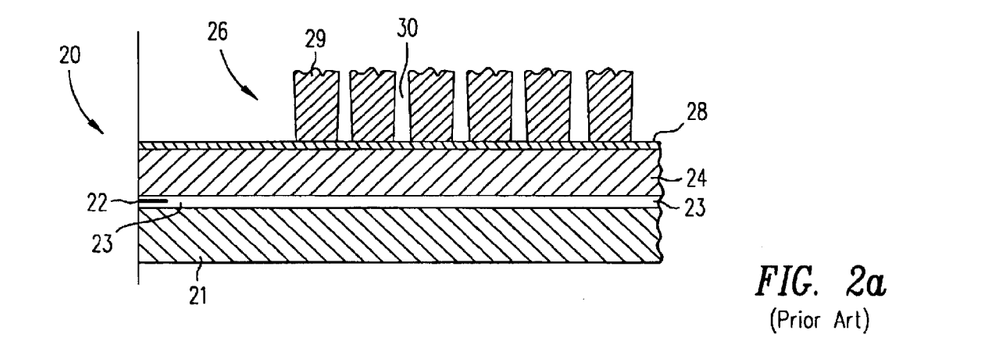
FIGS. 2a–c illustrate a prior art method for filling the voids between the coils of an inductive head.
Figure 2B:
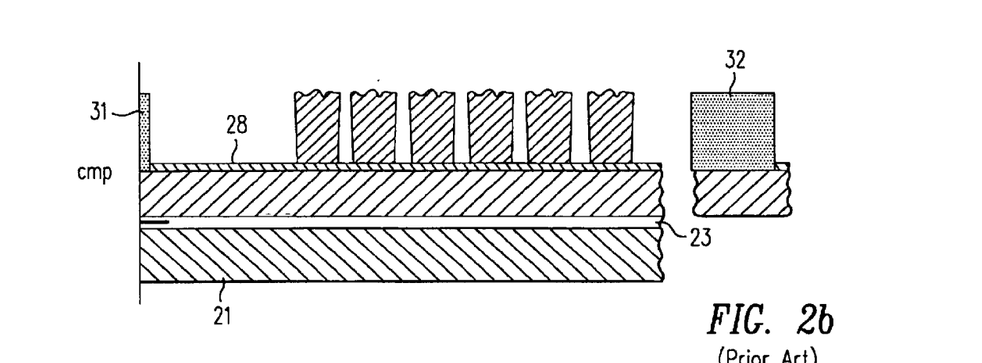

FIG. 2 illustrates an example of the problems that arise in providing planarization of the already formed coil structure during the manufacturing of a readwrite head. The read portion of the head 20 comprises a first shield (S1) 21, insulation layers 23 that surround a sensor element 22, and a second shield (S2) 24. In the merged head that is shown, the second shield also serves as a first pole piece (P1) 24 (referred to as S2/P1). A coil 26 is deposited on a layer of Al$_2$O$_3$, referred to as alumina (or sapphire) 28, which is used to insulate the coil from P1. The coil comprises a plurality of loops or turns 29 of conductive material (such as copper) with voids 30 in between the loops. Referring to FIG. 2b, the next step in the manufacturing process is the fabrication of the pedestal 31 (when used) and back flux closure (back gap) 32 using NiFe (or other ferromagnetic material) atop the S2/P1 24 after etching the alumina layer 28.

Figure 2C:
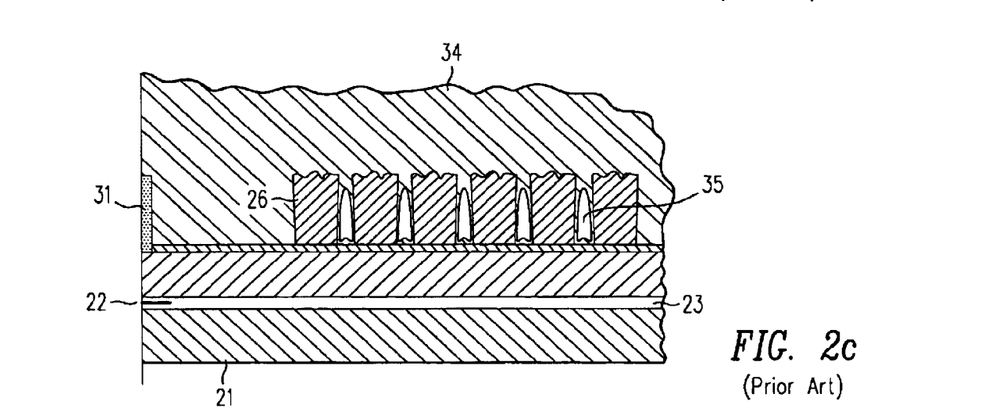

As shown in FIG. 2c, prior art head designs use alumina (Al$_2$O$_3$) 34 as the filler for the coils 26. Alumina is preferred because it provides good thermal conductivity as well as structural rigidity. Alumina also provides minimum protrusion and has a small expansion coefficient. However, the preferred high data rate head designs call for a very small separation for the high-resolution coil metal loops. For 1-micrometer pitch coils, the separation between loops can be as small as 0.2 micrometers. For such coils where the filler had been just alumina, the alumina sputtering system is incapable of completely filling the voids between the loops and instead, produces smaller voids 35 between the loops. Such voids are unwanted because it delays the thermal dissipation of working heat from the coils. Also, in multi-layer coil system heads (which provide an advantageous high density capability), there is a poor bonding ability between the coil layers in the presence of such voids.

The aspect ratio of the coils, the width versus thickness, is preferred very aggressive to accommodate as many turns per unit area as possible. That reduction of footprint enables the increase of efficiency as well as the reduction of inductance needed to produce a nominal recorded bit in a high coercivity medium.

There is a need for a method of fabricating coils having a coil pitch of 1 micrometer, where the separation of the metal coils is 0.2 micrometers, while the thickness of the metal coils is 2 micrometers. Due to the 10 to 1 aspect ratio between the loops, it is impossible to sufficiently fill the gaps between the loops by known prior art alumina deposit techniques.

Figure 3A:
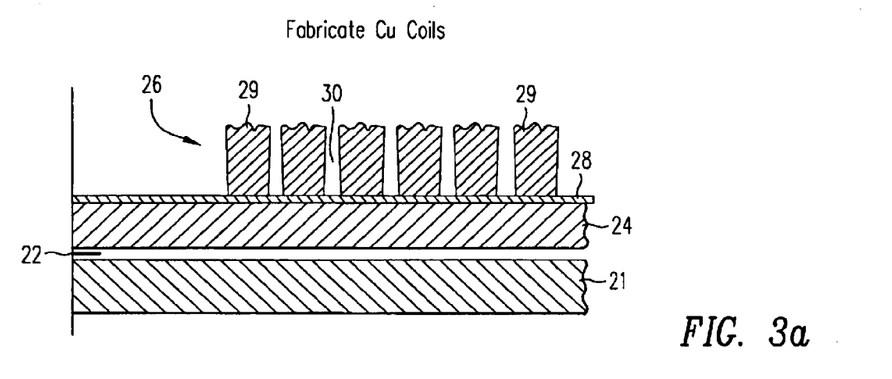
FIGS. 3a–c illustrate another method for filling the voids between the coils of an inductive head.
Figure 3B:
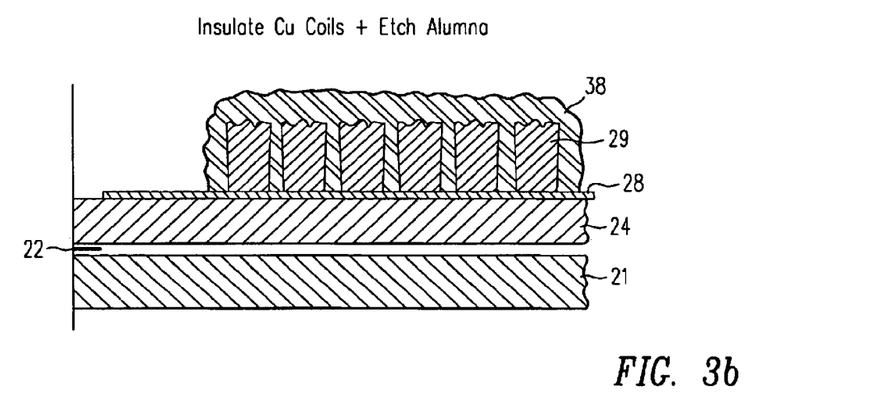
Figure 3C:
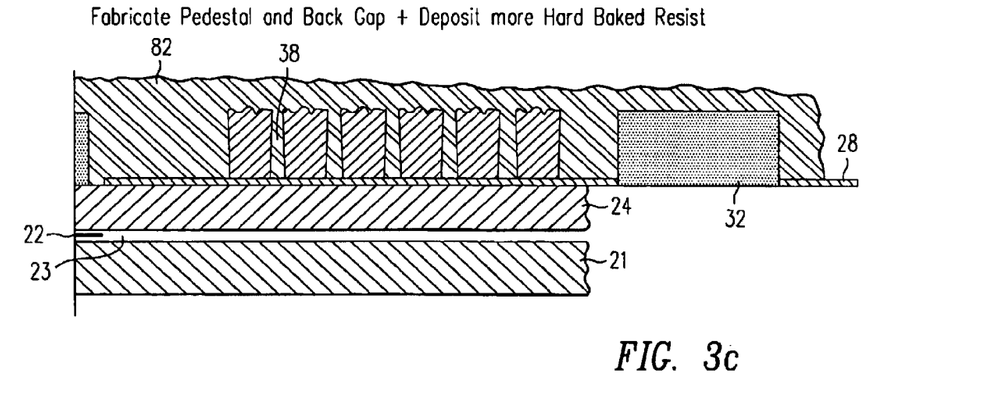

An alternate method of manufacturing the coil structure is shown in FIGS. 3a through 3c. The copper coils 26 are fabricated on the alumina layer 28 atop the S2/P1 24. Next, a hard baked photo-resist material 38 is applied to the coils (FIG. 3b). The pedestal 31 and back gap 32 are fabricated (from NiFe) on top of the S2/P1. Referring to FIG. 3c, more hard-baked photo-resist material 82 is deposited over the coils, and between the coils and back gap, at a thickness of 1.0 micrometer. Applying a hard baked photo-resist material accomplishes the sealing of the voids. The span of the S2/P1 from the first coil loop to the pedestal can be left open and later filled with alumina, since the aspect ratio between the first coil loop and pedestal is not as aggressive as the distance between the loops (the distance from the first coil loop to the pedestal being 4 um). However, if this were all that was done to fill the voids, there would be problems that arise during subsequent manufacturing processes.

It is very difficult for the chemical mechanical polishing (CMP) step, which is used to planarize the head, to planarize the hard-baked photo-resist material while missing the coils by stopping in the hard baked photo resist. Problems in the head arise if the CMP process exposes the copper coils and all of the other materials that are present. More particularly, the CMP process that planarizes the coil structure leaves small recesses along the copper/resist interface. Such recesses are in the order of 0.1 to 0.15 micrometers in depth and width, and are located at the copper side of the interface. It is believed that the amines present in the photo-resist material modify the copper material making it more prone to be etched and eroded. For very high-resolution coils, the voids prove to be almost as wide as the separation between the metal loops. If the quality of the subsequent planarization process is not of significant importance to the head design, simply using a hard baked photo-resist material to cover the coils can be used. However, for high performance heads, as previously described, the planarization of the coil structure is very important.

Alternatively, the coils can be plated very thinly (1.2 micrometers) with alumina wherein the CMP process exposes only alumina and NiFe (or metal of choice for the pedestal and pole piece). However, this process also results in coil resistance and plating uniformity problems.

Therefore, there is a need to be able to fill the voids between the coils and be able to planarize the coil without producing any voids or gaps.

There is a need for a method of planarizing the coils which can be done efficiently and without producing any voids and which would also enable proper insulation for placement of the second layer of coils.

More particularly, there is a need for an efficient and consistent way of planarizing the coil structure in a high efficiency thin film head so that there is proper insulation between the layers of coils even if there are imperfections such as minor grooving or defects on the first layer of coils.

One or more of the foregoing problems are solved and one or more of the foregoing needs are filled by the invention described herein.

SUMMARY OF THE INVENTION

It is an object of the preferred embodiment of the invention to provide a planarized coil formation without any gaps or voids, or wherein any minor gaps or voids do not effect a second layer of coils.

It is a further object of the invention to provide a method for planarizing the coils without defects. The absence of the defects permits the further fabrication of other structures on top of the coils without electrical problems such as shorting or optical problems during a subsequent photo exposure reflective notching process.

A thin film inductive head design is provided wherein the head has bi-layer coils, a pedestal and a stitched yoke where the first layer of coils that are on the same plane as the pedestal are filled with hard baked photo resist. The top of the photo resist is removed via an O$_2$ reactive ion etching (RIE) step to reduce its thickness in relation to the adjacent pedestal and coils. The resulting voids are filled with alumina or a hard carbon. A subsequent chemical mechanical (CMP) polishing process is used to planarize the exposed material (Cu, NiFe, and alumina).

A method is provided for manufacturing a thin film inductive write head. A pedestal and back flux closure of ferromagnetic material are formed on opposite ends of a planarized first pole piece. A plurality of coils of conductive material are deposited on top of a layer of alumina deposited on top of the first pole piece between the pedestal and back flux closure. The coils comprise a plurality of loops or turns having voids between the coil loops. A hard-baked photo resist material is deposited in the voids between the coils and the back flux closure. A layer of alumina is deposited over the coils and hard baked photo resist material. The pedestal, back gap, coils, photo resist, and alumina are planarized using a chemical mechanical polishing (CMP) process. The thickness of the photo resist material relative to the coils is reduced using an $O_2$ reactive ion etching process. A hard carbon filler is applied to fill the gaps between the coils and the photo resist material. A CMP process is performed to planarize the carbon filler, coils, back flux closure and the pedestal.

To complete the fabrication of the head, a write gap and track width defining pole are fabricated. For a dual layer coil head design, the second layer of copper coils are fabricated and planarized in the same fashion exposing, after the CMP, the tops of the NiFe poles, alumina, hard carbon or alumina filler, and copper coils. The coils are then insulated from the subsequent ferromagnetic yokes and the ferromagnetic yokes are fabricated.

In the preferred embodiment the coil pitch is 1 um and the separation of the metal coils is 0.2 um and the thickness of the metal coils is 2 um.

The above and other objects, teachings, and advantages of the invention will be more clearly understood from the following detailed description when read in conjunction with the accompanying drawing.

BRIEF DESCRIPTION OF THE DRAWING

FIGS. 4a and 4b are cross-sectional views of the preferred embodiment of the inductive head having a single and dual layers of coils, respectively, illustrating the components and structure there of.

FIG. 4c is a top view of the inductive head of FIG. 4a.

DETAILED DESCRIPTION OF THE PREFERRED EMBODIMENT

Figure 4A:
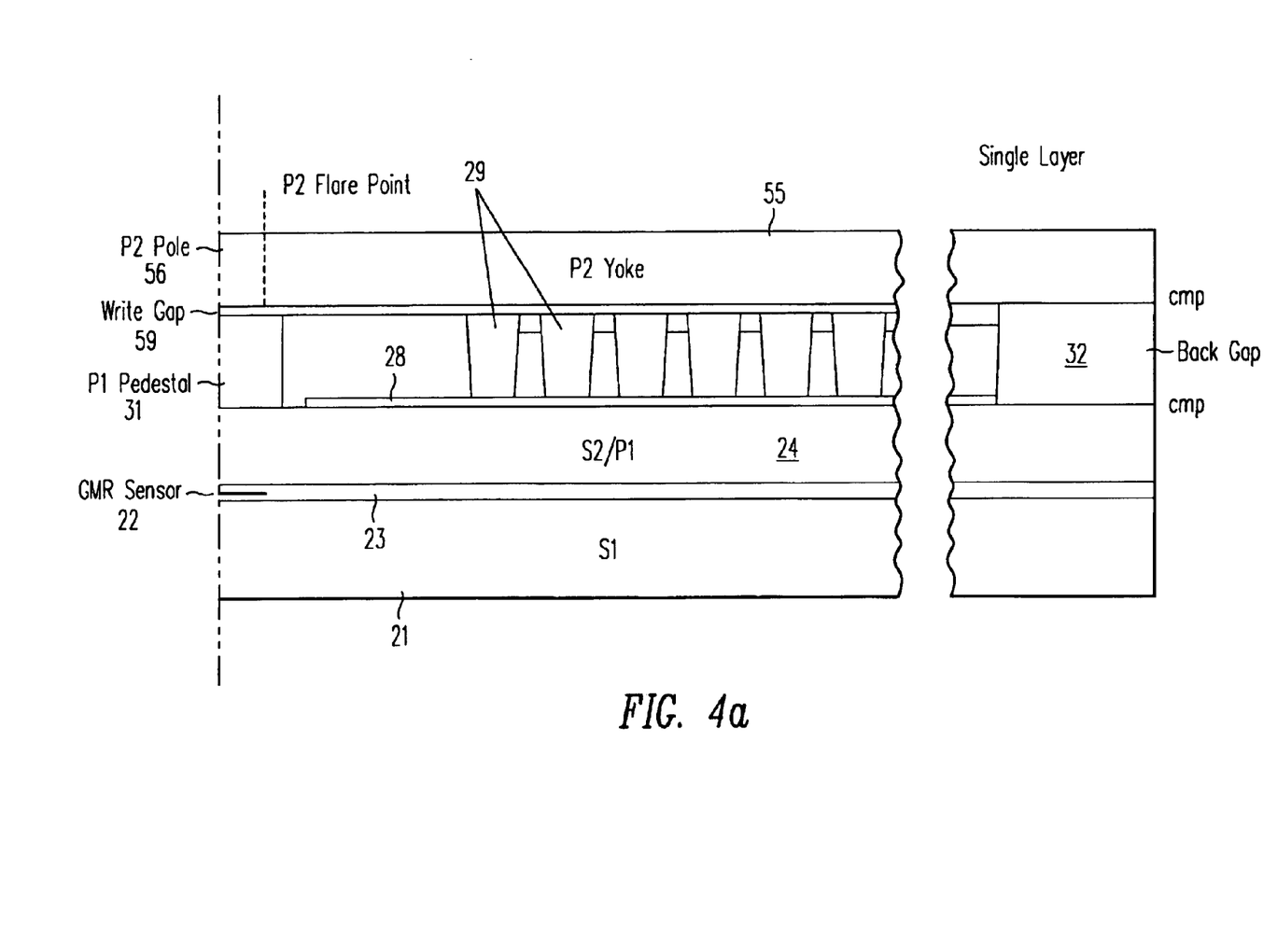
Figure 4B:
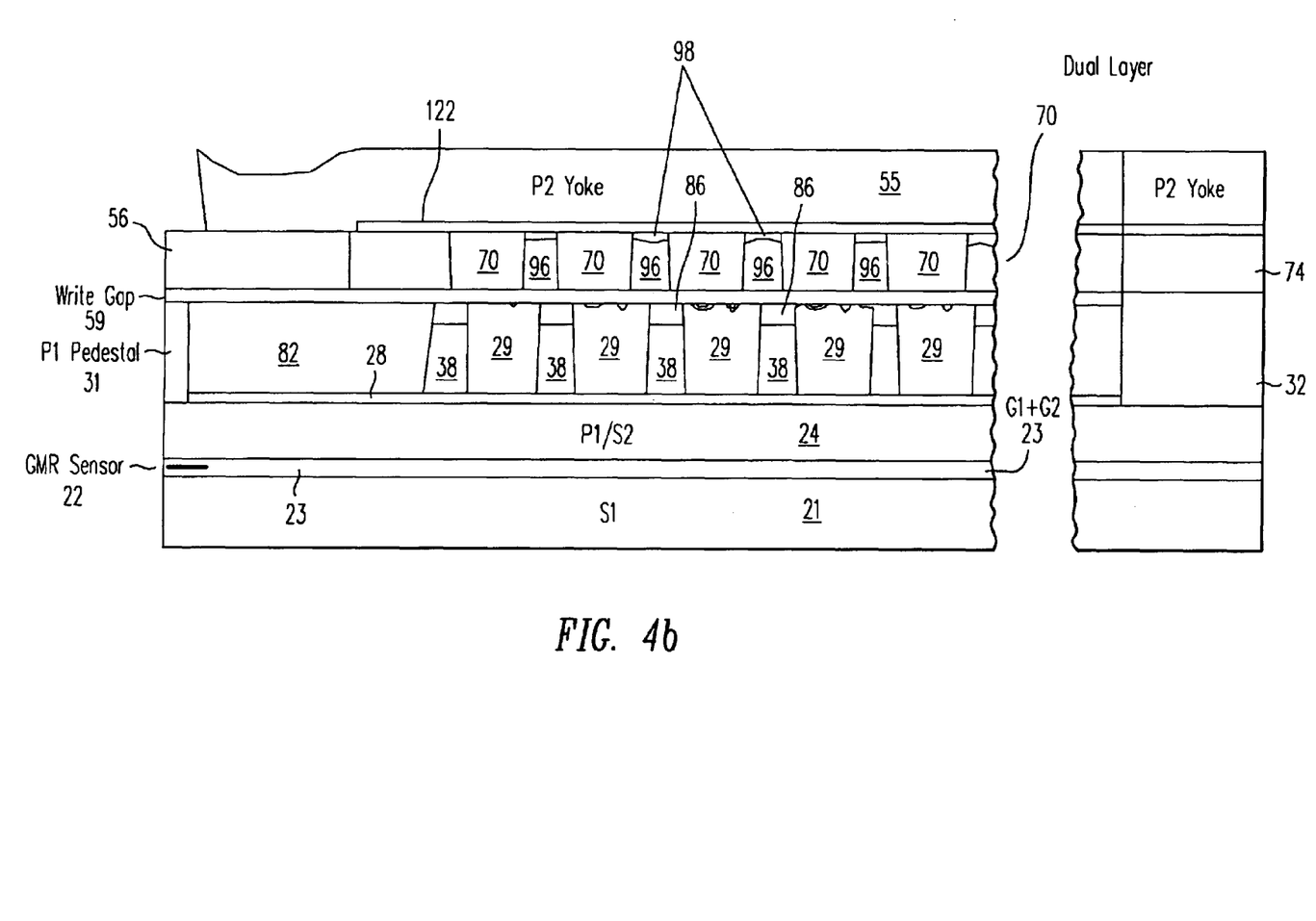

Referring to FIGS. 4a and 4b, the cross sectional views of two implementations of high data rate, high efficiency, inductive thin film heads are shown. In both implementations, the head is composed of elements that perform the task of writing and reading magnetic data.

It is conventional for thousands of heads to be manufactured simultaneously on single wafer in a plurality of rows and columns. After completion of the head assemblies on the wafer, the wafer is diced into individual rows and columns. The surface of each row is then lapped, which is a grinding process. After lapping, each row is diced into individual magnetic heads. For simplicity, the head manufacturing processes will typically be described for a single head, but it is to be understood that most of the process steps are performed over the entire wafer and are therefore, forming structures for thousands of heads simultaneously.

This invention is directed towards the write portion of the head. Typically, the read portion of the transducer is fabricated first. However, it is also known to fabricate the write head portion first.

FIG. 4a shows a cross-sectional view of the magnetic read-write head assembly having a single layer of coils according to a preferred embodiment of the invention. The read head comprises a first shield, S1 21, and two insulation (gap) layers 23, which surround a sensor element 22. In a merged (read-write) head, as shown, the second shield (S2) 24 also serves as first pole piece (P1) for the write head (referred to as the P1/S2 layer). The body portion of the head (the "yoke") P2 55 also includes a pole tip 56. The yoke 55 connects a P1 pedestal 31 to a back flux closure (back gap) 32. The P2 pole tip 56 confronts the P1 pedestal 31 at the write gap 59, which is at the air-bearing surface ("ABS"). Metal coil loops 29 (typically of copper) are deposited on a layer of alumina 28 on top of the P1/S2 24. The head has three pole pieces: P1 24, the P1 pedestal 31, and P2 56.

At the present time, write heads typically have one coil layer (as shown in FIG. 4a). However, it can be particularly desirable to design write heads with two layers of coils 29 and 70, as shown in FIG. 4b. The P2 yoke 55 arches over the two layers of coil loops and the photo-resist material and filler surrounding the coil loops (which will be more fully described below).

As recording densities increase, the width of the written track must decrease. For example, a recording density of 40 gigabytes per square inch requires an effective pole tip size of 0.35 microns. The increases in the coercivity of the ferromagnetic thin film on the disk and the recording speed, increases the need for the write head to have high magnetic efficiency with low inductance. These requirements make it necessary to place the inductive components closer to the pole tips. In order to achieve these goals, there is a greater need to planarize the coil structure.

As seen in FIGS. 4a and 4b, the magnetic head assembly has a write head with a pedestal piece 31 on P1 24 and a planarized write gap layer 59 with either a single or multi-layer coil structure. The P1 pole piece, P1 pedestal pole piece, coil loops and P2 pole piece need to be formed on an essentially planarized surface in order to allow maximum precision to be obtained from the photolithographic manufacturing process.

The P1 pedestal 31 defines a zero throat height with a 90-degree apex angle, which cuts down flux leakage and improves efficiency. The P1 pedestal allows the distance from the zero throat height to the ABS to be reduced which allows the coil turns to be located close to the write gap which in turn increases the magnetic efficiency. The yoke of the dual coil layers (29 and 70) write head (FIG. 4b) has upper and lower back flux closure pieces 32 and 74, which facilitate making P1 and P2 planar.

FIGS. 4a and 4b show a sectional view, perpendicular to the air-bearing surface of the head according to the preferred embodiment of the invention. The first ferromagnetic element (pole piece P1) is formed on a substrate and includes a pole tip region and a back gap region. The P1 element is typically a nickel iron (NiFe) alloy but other ferromagnetic alloys may be suitable. The thickness and proportions shown are not to scale. Overlying the element P1 is a gap layer of a non-magnetic material, typically alumina or silica ($SiO_2$). The gap layer is formed to a thickness of 0.3 micrometers, for example, and extends from the pole tip region towards the back gap at the other end of the ferromagnetic element P1, ending prior to the back gap region. Through photo lithographic, chemical vapor depositing, or plating processes one or more layers of coils are formed on the alumina insulation layer and are set back from the zero throat height (ZTH).

Figure 4C:
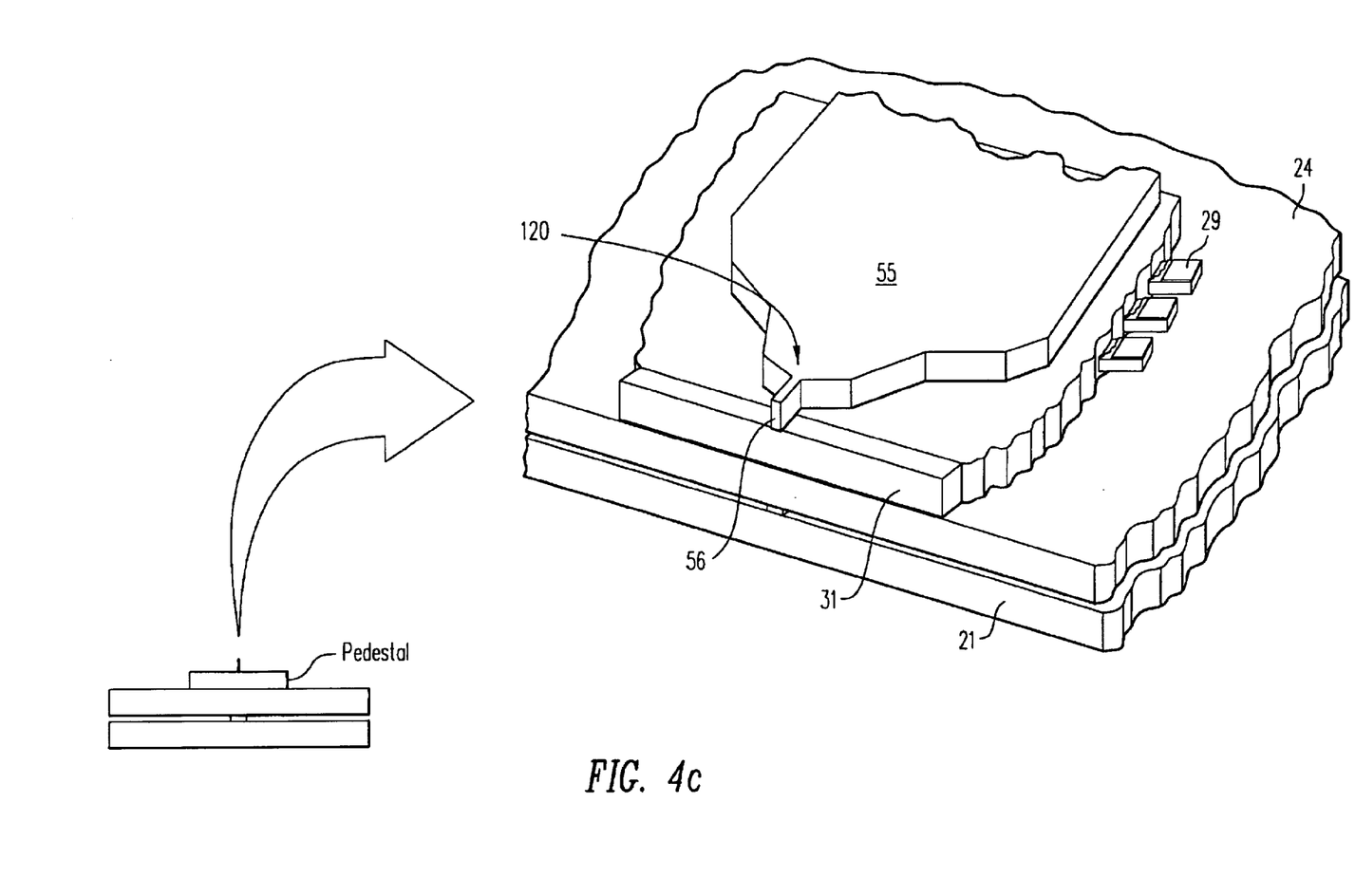

FIG. 4c provides a top perspective view of head shown in FIG. 4a. FIG. 4c provides a better illustration of the relationship between the P2 pole tip 56 and the P1 pedestal pole piece 31. FIG. 4c also provides further illustration of the positioning of the coil loops 29 atop the P1 pole piece 24. The back portion including the back flux closure is not shown.

FIGS. 5 and 6 illustrate the preferred embodiment for manufacturing and planarizing the coil structure for a high data rate, high efficiency thin film inductive head.

While the processes for planarizing the coil structure will be described particularly for a head with two layers of coils and a pedestal, it will be understood by those skilled in the art that this process equally applicable to a head having a single layer of coils and can even be extended to a head having three or more layers of coils. FIGS. 3a and 3b illustrate the process for fabricating the copper coil loops 29 and NiFe pedestal 31 atop the S2/P1 24.

The upper surface of P1 is preferably planarized to establish a well-controlled surface for the subsequent formation of the first coil in order to achieve a small coil pitch. A thin layer of dielectric materials, such as alumina, is vacuumed deposited over P1 to provide the space for the set of coils. Since the alumina is vacuumed deposited, the planarity of the surface is not significantly disturbed. The alumina only needs to be thick of enough to provide the required insulating surface.

Preferably, the coil pitch is 1 micrometer and the separation of metal coils is 0.2 micrometers and the thickness of the coils is 2 micrometers providing a 10 to 1 aspect ratio between the loops. The coils are shaped the same as prior art coils.

After the coil has been formed, the alumina layer is etched away to form vias in which ferromagnetic material (such as NiFe) is subsequently deposited to form the pedestal and back gap. After the vias have formed, the coil is protectively insulated by a photo-resist material, which fills in between the coils turns but is removed from the vias in order to form the P1 pedestal, which will serve as the P1 pole tip, and the lower back flux closure, which will connect P1 and the upper back flux closure at the back of the completed yoke. The P1 pedestal and lower back flux closure are preferably formed simultaneously from ferromagnetic material, such as NiFe, using prior art electro-plating techniques. The P1 pedestal and lower back flux closure extend at least to the height required to achieve the desire thickness of the coil.

The coils need to be planarized in order to complete the top portion yoke with the P2 pole piece or for the fabrication of a second layer of coils. As described previously, if a thick layer of alumina was deposited over the coils, voids would form between the coils and the pedestal. Alternatively, if the coil voids were filled a hard baked photo-resist, the subsequent CMP process, to planarize the structure, would need to flatten the coil structure while missing the copper coils, stopping at the hard baked photo resist. The foregoing procedure is very difficult to accomplish since it requires a level of precision and consistency from the CMP process that is not possible to achieve. If the CMP process flattens the coil structure, exposing the copper, there would four materials that are exposed: the alumina, the NiFe, the copper, and the photo-resist, which would create difficulties for the ability of the inductive head to be fabricated properly without being shorted.

Figure 5A:
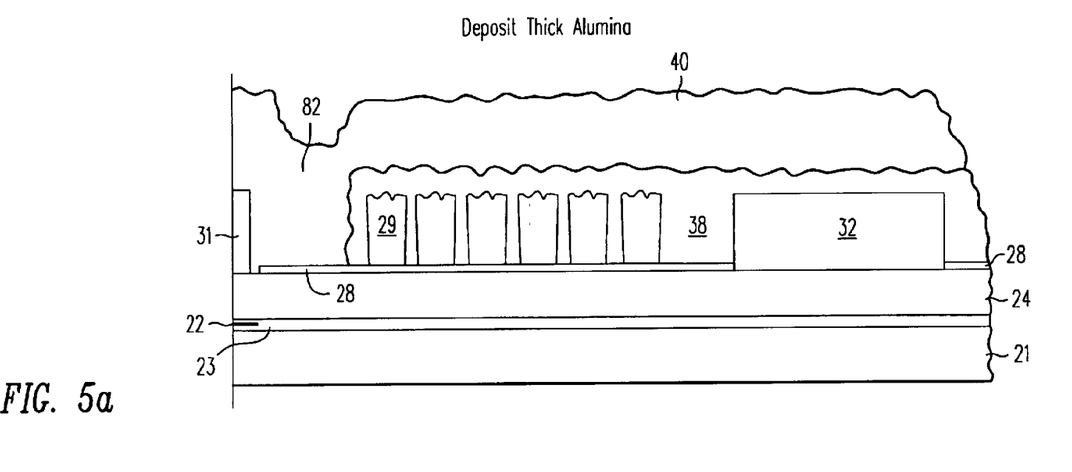
FIGS. 5a–e illustrate the process steps for filling the voids in between the coils according the preferred embodiment of the invention.

FIG. 5a shows the head in the process of being manufactured having a first shield S1 21 of ferromagnetic material (such as NiFe), a gap layer 23 of non-ferromagnetic material (containing a sensor 22), a second shield/first pole piece S2/P1 24 of ferromagnetic material, a pedestal 31 and back flux closure (back gap) 32 of ferromagnetic material. A layer of insulation 28 and coil loops 29 are formed between the pedestal 31 and back flux closure 32. As shown in FIG. 5a, a photo-resist material 38 has been placed around the coil loops 29 and between the coils and back gap 32. Next, a thick alumina 82 has been applied for protection during planarization, covering the photo-resist 38 and filling in between the resist 38 and pedestal 31.

Figure 5B:
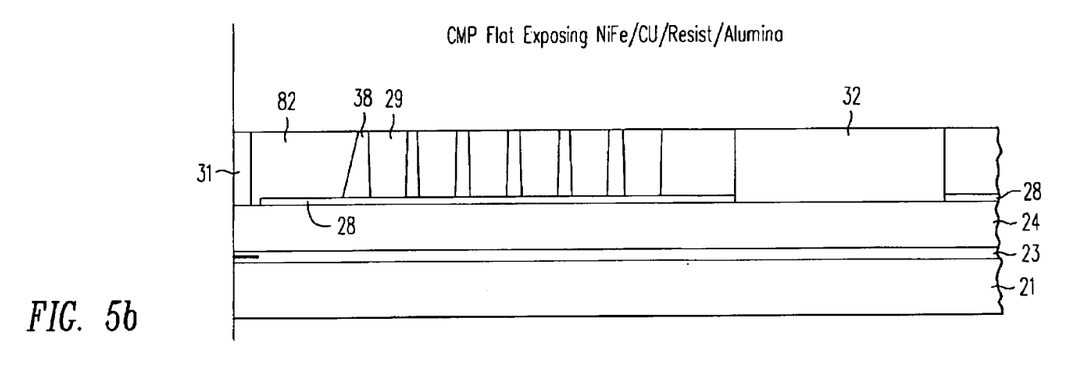

Referring to FIG. 5b, a chemical mechanical polishing (CMP) process, which is well known in the industry, has been performed to planarize the coil structure exposing the pedestal 31 and coils 29. The thick alumina 82 is only present between the outermost coil protection resist 38 and the pedestal 31 after the CMP process.

Figure 5C:
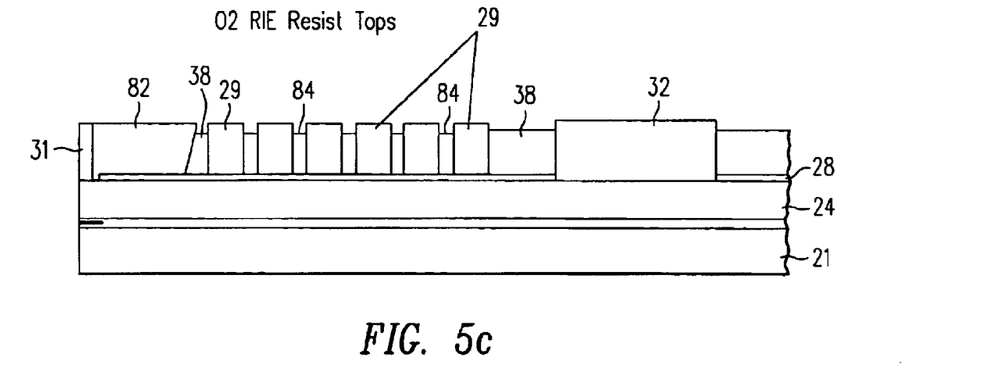

Next, as seen in FIG. 5c, a reactive ion etching (RIE) technique using $O_2$ gas (which is well known in the industry) is performed to reduce the thickness of the hard baked photo-resist polymer 38 relative to the coil loops 29 by removing the top portion of the photo-resist polymer, leaving gaps 84.

Figure 5D:
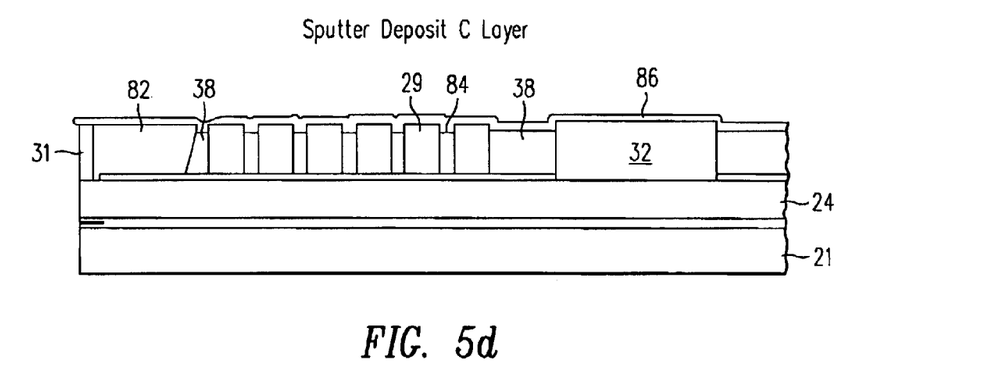
Figure 5E:
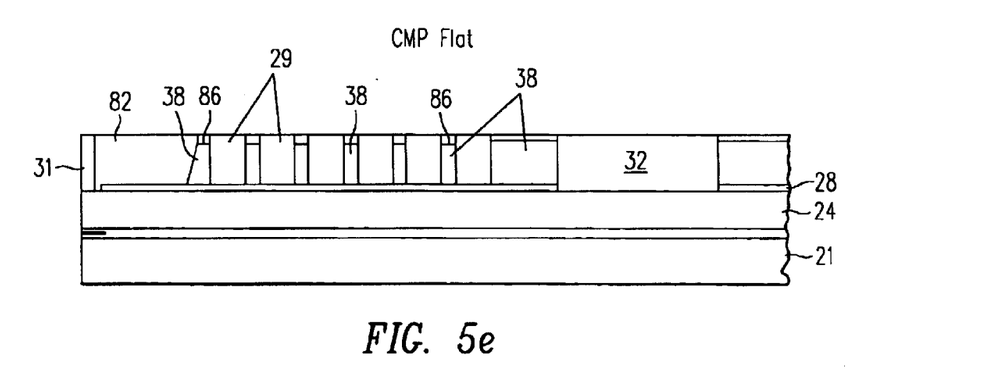

Referring to FIG. 5d, a thin layer of filler 86 is applied to fill the gaps 84 created by the $O_2$ RIE process. Preferably the filler 86 is a hard (diamond-like) carbon. Alternatively, the filler 86 can be alumina. A CMP process is then performed to planarize the coil structure with the carbon filler 86 providing an end point over the hard baked photo-resist 38 (FIG. 5e). Preferably, the CMP cycle exposes only alumina, NiFe, possibly copper, and the carbon or alumina filler on top of the hard baked photo-resist polymer, with no recesses between the material interfaces.

For a head design having a single layer of coils (as shown in FIG. 4a), the head fabrication is completed by first placing a layer of alumina protectorate over the coils and then planarizing with a CMP cycle. Next, a write gap layer 59 comprising alumina (or other non-ferromagnetic material) is applied over the pedestal 31 and alumina protectorate leaving open the back gap. The P2 yoke 55 is then fabricated over the write gap.

Figure 6A:
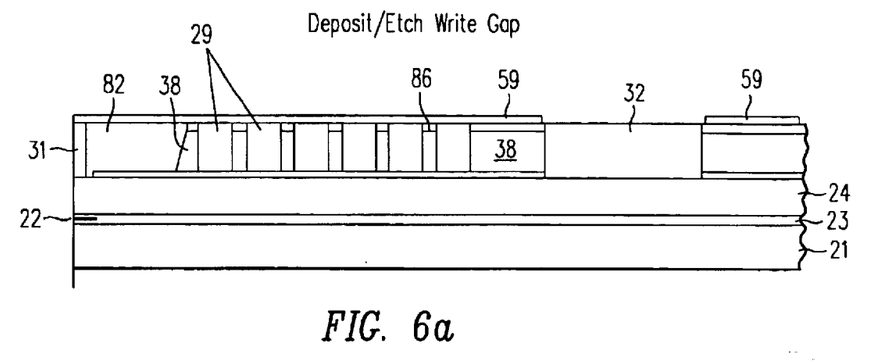
FIGS. 6a–i illustrate the placement of a second layer of coils and the filling of the voids in the second layer of coils according to a preferred embodiment of the invention.

The procedure for placing a second layer of coils atop the first coil structure will be described with reference to FIGS. 6a through 6i. Referring to FIG. 6a, an alumina write gap 59 is placed over the planarized coil structure leaving open the back gap 32.

Figure 6B:
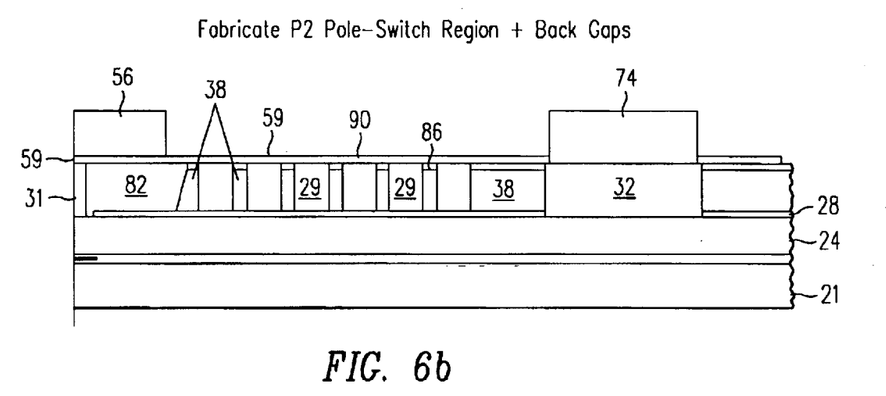

Next, the upper back flux closure 74 is formed in the etched via. Vias are also etched for the next level of the coils. The P2 pole tip 56 is deposited on the gap layer 59 to confront the P1 pedestal 31. The upper back flux closure 74 and P2 pole tip 56 are preferably formed simultaneously from ferromagnetic material using standard photolithographic technique and plating. The P2 pole 56 has at its back an enlargement called the stitched region 120 used to land (affix) the P2 yoke (see FIG. 4c).

Figure 6C:
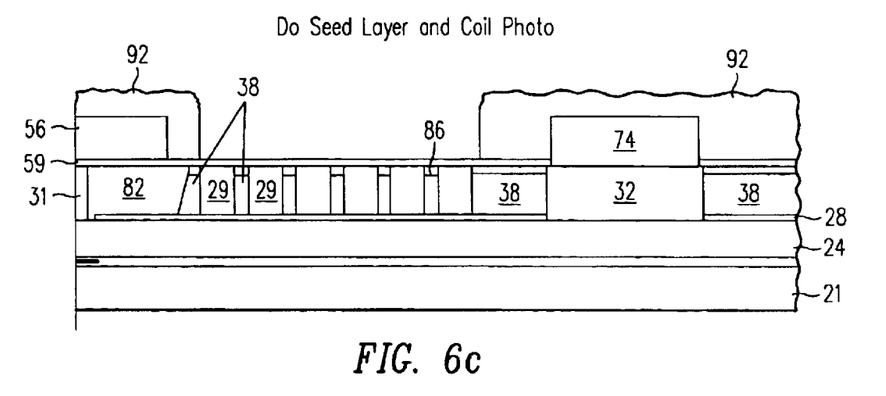

As shown in FIG. 6c, a protective material 92, such as alumina, is applied over the ferromagnetic structures (the pole tip 56 and upper back flux closure 74) to protect these structures during the fabrication of the second coil structure. After a seed layer is deposited in the etched vias, the upper set of coil loops 70 is formed on the write gap layer 59, which is a well-planarized surface since it is vacuum deposited, onto the planarized surface previously described.

Figure 6D:
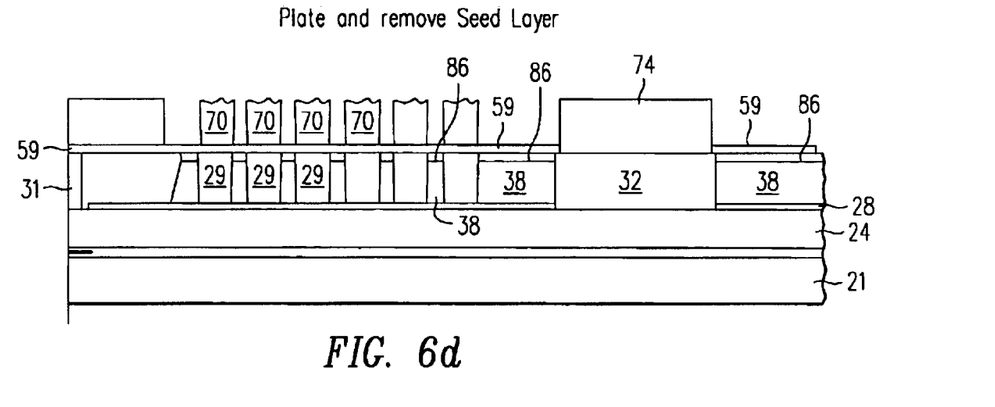

As shown in FIG. 6d, the procedure for forming the second level of coils continues as described for the prior level coils. The seed layer is applied and the copper material is electroplated to form the second level of coil loops 70.

Figure 6E:
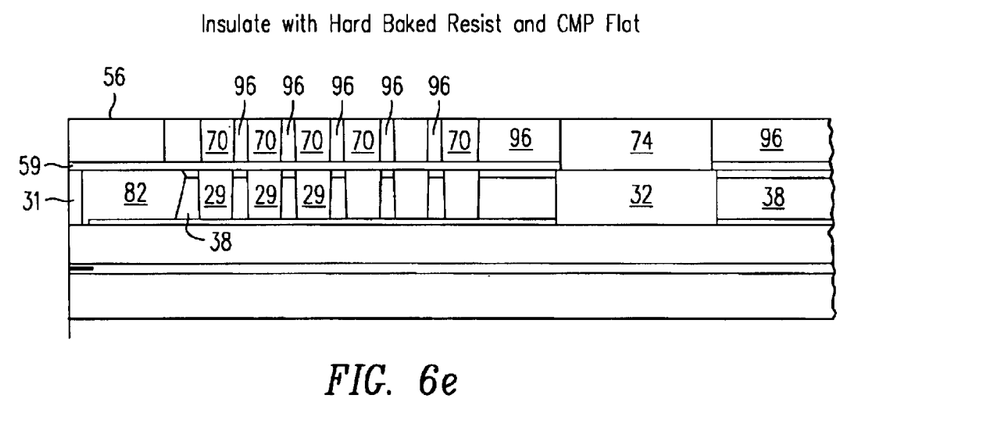

Referring to FIG. 6e, the coil loops are insulated with a photo-resist material 96 that is hard baked. The head assembly is then planarized using a CMP process exposing the P2 pole tip 56 and second layer of coil loops 70.

Figure 6F:
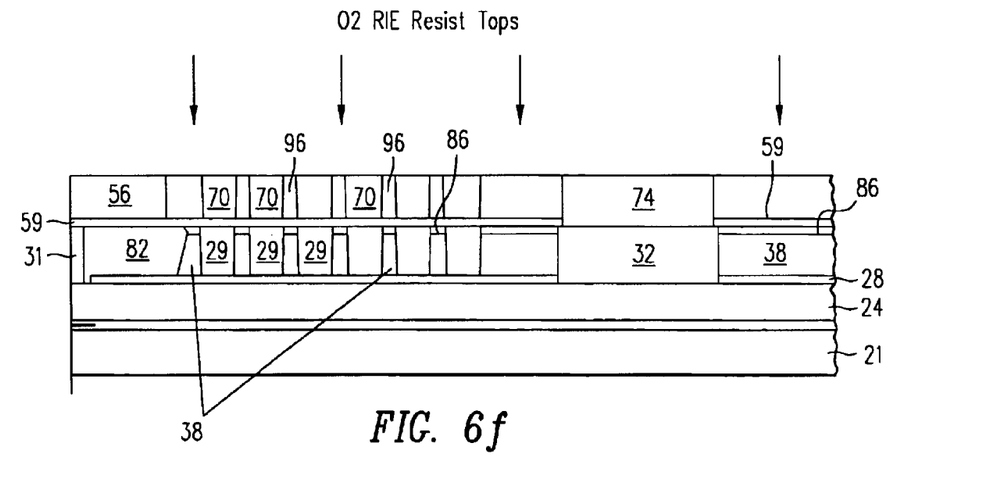
Figure 6G:
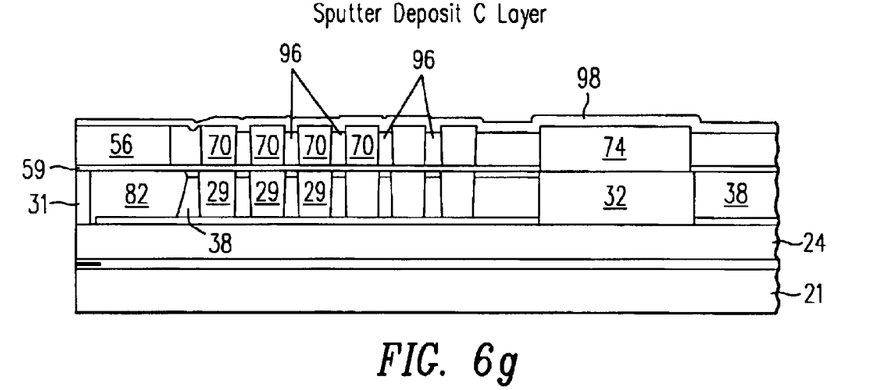

Referring to FIG. 6f, an $O_2$ RIE process is used to reduce the height of the photoresist material 96 relative to the coil loops 70. Afterwards, as seen in FIG. 6g, a filler, preferably of a hard diamond-like carbon substance or alumina 98 is applied filling the gaps created by the RIE process.

Figure 6H:
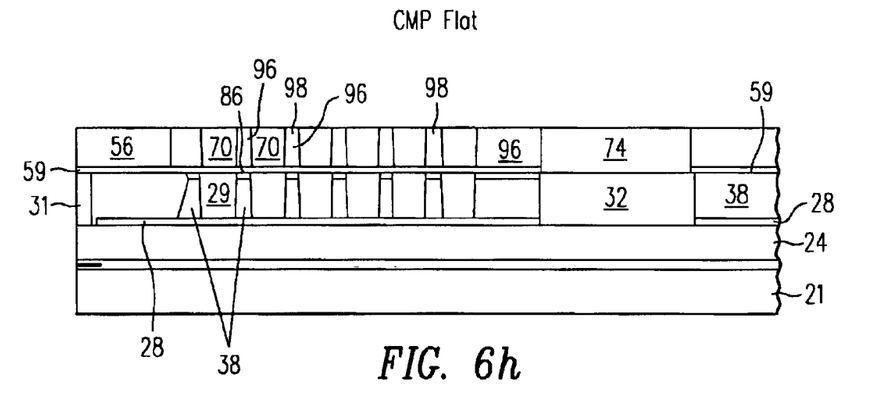
Figure 6I:
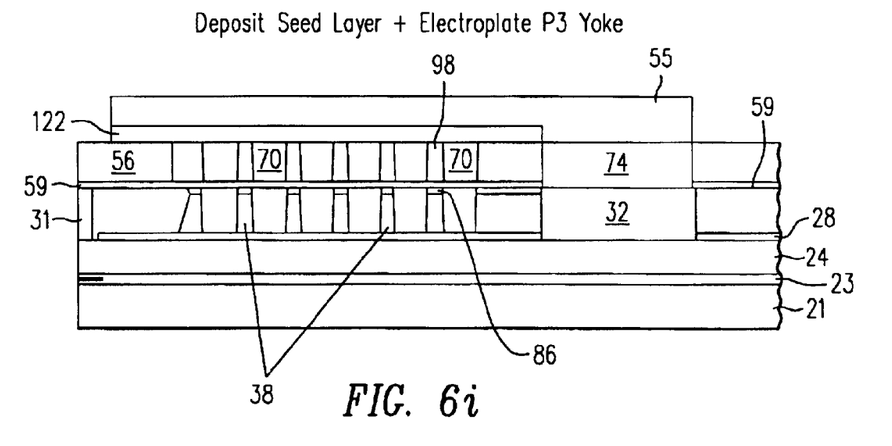

Referring to FIG. 6h, the head assembly is again planarized using a CMP process, which exposes the filler and coils. The head assembly structure is then insulated with alumina and vias are opened at the P2 stitch region and at the back gap. Referring to FIG. 6i, after depositing an insulative layer 122 atop the coils with an opening for the P2 pole 56 and the upper back gap 74, a seed layer is deposited and the P2 yoke 55 is electroplated. The head assembly structure, including the P2 yoke 55 is then finished.

The problems of defects along side the coils are solved by not having photo-resist exposed to the CMP process. The problem of too thin coils or coils insulated with resist atop is solved by being able to CMP into the copper level with defects. The problems of voids between the copper coil loop is solved by partially filling the voids with resist and later on finishing by filling the rest with alumina or carbon.

In a preferred embodiment, the length of a head is 10 micrometers, the P2 pole is 1.8 micrometers, the pedestal is 2.0 micrometers tall and the pedestal depth is 0.5 to 0.75 micrometers, the P2 length is 3 micrometers, the first coil start is 4 micrometers and the second coil start is 4 micrometers, the first coils are 2 micrometers thick and the second coils are 1.6 micrometers thick, the alumina under the P2 yoke 0.3 micrometers, between the second coils is 0.2 micrometers with the pitch of 1.0 micrometers, the first coils also have a pitch of 1.0 micrometers.

While the present invention has been shown in specific embodiment, it is apparent to one skilled in the art that various changes may be made without departing from the spirit and scope of the invention.

We claim:

1. A magnetic head assembly comprising:
   a first pole piece;
   a pedestal of ferromagnetic material on on end of the first pole piece;
   a back flux closure of ferromagnetic material on the first pole pice across from the pedestal;
   a layer of coils comprising a plurality of oops of conductive material on top of the first pole piece between the pedestal and the back flux closure;
   a hard baked photo-resist material between the pedestal, each coil loop and the back flux closure, wherein the thickness of the photo-resist material relative the coil thickness is reduced;
   a filler between the coil loops on top of the reduced thickness hard baked photo resist material, wherein the pedestal, back flux closure and coils, having the hard baked photo-resist material and filler between each coil loop, are planarized; and
   a write gap layer of non-magnetic material on top of the filler.

2. The magnetic head assembly of claim 1 wherein the filler between the coil loops atop the reduced thickness hard baked photo resist material is a hard carbon material.

3. The magnetic head assembly of claim 1 wherein the filler between the coil loops atop the reduced thickness hard baked photo resist material is alumina.

4. The magnetic head assembly of claim 1 further comprising a second pole piece on top of the write gap.

5. The magnetic head assembly of claim 1 further comprising:
   a second layer of coils, on top of the write gap, said second layer of coils having a hard baked photo resist layer topped with a hard carbon filler between coil loops; and
   a second pole piece on top of the second layer of coils.

6. The magnetic head assembly of claim 1 wherein the coil pitch is approximately 1 um and the thickness of the coils is approximately 2 um.

7. The magnetic head assembly of claim 1 wherein the pedestal and back flux closure are composed of NiFe and the coils are composed of Cu.

8. The magnetic head assembly of claim 1 wherein the thickness of the hard baked photo resist material is reduced relative the coil loops using a reactive ion etching process.

9. A disk drive assembly having a magnetic disk for recording data and a head comprising:
   a first pole piece;
   a pedestal of ferromagnetic material on on end of the first pole piece;
   a back flux closure of ferromagnetic material on the first pole pice across from the pedestal;
   a layer of coils comprising a plurality of oops of conductive material on top of the first pole piece between the pedestal and the back flux closure;
   a hard baked photo-resist material between the pedestal, each coil loop and the back flux closure, wherein the thickness of the photo-resist material relative the coil thickness is reduced;
   a filler between the coil loops on top of the reduced thickness hard baked photo resist material, wherein the pedestal, back flux closure and coils, having the hard baked photo-resist material and filler between each coil loop, are planarized; and
   a write gap layer of non-magnetic material on top of the filler.

10. The disk drive assembly of claim 9 wherein the filler between the coil loops atop the reduced thickness hard baked photo resist material is a hard carbon material.

11. The disk drive assembly of claim 9 wherein the filler between the coil loops atop the reduced thickness hard baked photo resist material is alumina.

12. The disk drive assembly of claim 9 further comprising a second pole piece on top of the write gap.

13. The disk drive assembly of claim 9 further comprising:
   a second layer of coils, on top of the write gap, said second layer of coils having a hard baked photo resist layer topped with a hard carbon filler between coil loops; and
   a second pole piece on top of the second layer of coils.

14. The disk drive assembly of claim 9 wherein the coil pitch is approximately 1 um and the thickness of the coils is approximately 2 um.

15. The disk drive assembly of claim 9 wherein the pedestal and back flux closure are composed of NiFe and the coils are composed of Cu.

16. The disk drive assembly of claim 9 wherein the thickness of the hard baked photo resist material is reduced relative the coil loops using a reactive ion etching process.

17. A method of manufacturing a thin film inductive write head comprising the steps of:
   forming a pedestal and back flux closure on opposite ends of a first pole piece of ferromagnetic material;

depositing a plurality of coils of conductive materials on top of the first pole piece comprising a plurality of loops having voids between the coil loops;

depositing a photo-resist material in the voids between the coil loops and hard baking the photo-resist material;

depositing alumina over the photo-resist material;

planarizing the pedestal, back flux closure, coils, hard baked photo-resist, and alumina using a chemical mechanical polishing (CMP) process;

reducing the thickness of the photo-resist material relative the coils using a O$_2$ reactive ion etching (RIE) process;

applying a filler to fill in gaps between the coils and reduced thickness photo-resist material; and performing a CMP process to planarize the filler, coils, and back flux closure.

18. The method of manufacturing thin film conductive head according to claim 17 further comprising the step of:

fabricating a write gap over the planarized coil structure;

fabricating a width-defining pole piece over the write gap.

19. The method of manufacturing a thin film inductive write head according to claim 17 further comprising the steps of:

depositing a write gap of non-ferromagnetic material over the alumina protectorate layer;

depositing ferromagnetic material on top of the write-gap to form a pole tip and a second layer back flux closure;

depositing conductive material on top of the non-ferromagnetic material to form a second layer of coils having a plurality of loops with voids between the loops;

depositing a photo-resist material in the voids between the second layer of coil loops, which is hard baked;

reducing the thickness of the hard baked photo resist material relative the coils;

depositing a filler on top of the reduced thickness photo-resist material;

depositing a layer of insulation over the coils; and etching the second layer back flux closure and fabricating the P2 yoke.

20. The method of manufacturing a thin film inductive head according to claim 17 wherein the coil loops are 2 um thick and the coil pitch is 1 um.

21. The method of manufacturing a thin film inductive head according to claim 17 wherein the filler deposited over the reduced thickness photo-resist material is a hard carbon.

22. The method of manufacturing a thin film inductive head according to claim 17 wherein the filler deposited over the reduced thickness photo-resist material is alumina.

23. The method of manufacturing a thin film inductive head according to claim 17 wherein the pedestal and back flux closure are composed of NiFe and the coils are composed of Cu.

* * * * *

UNITED STATES PATENT AND TRADEMARK OFFICE
CERTIFICATE OF CORRECTION

PATENT NO. : 6,757,134 B2 Page 1 of 1
APPLICATION NO. : 10/095882
DATED : June 29, 2004
INVENTOR(S) : Hugo Alberto Emilio Santini

It is certified that error appears in the above-identified patent and that said Letters Patent is hereby corrected as shown below:

Title Page Item # (12) remove "Emilio"

In the claims:
column 9, line 44 claim 1 change "pice" to --piece--
column 9, line 45 claim 1 change "oops" to --loops--
column 10, line 20 claim 9 after the word "on" and before the word "end" change "on" to --one--
column 10, line 23 claim 9 change "pice" to --piece--
column 10, line 24 claim 9 change "oops" to --loops--

Signed and Sealed this

Eighth Day of April, 2008

JON W. DUDAS
*Director of the United States Patent and Trademark Office*